United States Patent
Ibe et al.

(10) Patent No.: US 6,950,222 B2
(45) Date of Patent: *Sep. 27, 2005

(54) APPARATUS AND METHOD FOR OPTICAL MODULATION

(75) Inventors: Hiroyuki Ibe, Kanagawa (JP); Masahide Miyachi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 10/666,251

(22) Filed: Sep. 22, 2003

(65) Prior Publication Data

US 2005/0012978 A1 Jan. 20, 2005

Related U.S. Application Data

(63) Continuation of application No. 10/232,675, filed on Sep. 3, 2002, now Pat. No. 6,643,046.

(30) Foreign Application Priority Data

Sep. 26, 2001 (JP) ........................... 2001-294957

(51) Int. Cl.⁷ ............................................. G02F 1/01
(52) U.S. Cl. .................. 359/279; 359/238; 359/239
(58) Field of Search ................................ 359/238, 239, 359/245, 276, 279; 398/172, 77

(56) References Cited

U.S. PATENT DOCUMENTS

| 5,303,079 A | 4/1994 | Gnauck et al. ............. 398/182 |
| 5,408,544 A | 4/1995 | Seino ............................ 385/3 |
| 6,072,615 A | 6/2000 | Mamyshev ................. 398/185 |
| 6,384,954 B1 | 5/2002 | Webb .......................... 359/245 |
| 6,643,046 B2 * | 11/2003 | Ibe et al. ..................... 359/238 |
| 2002/0044723 A1 | 4/2002 | Hironishi ..................... 385/24 |
| 2003/0002121 A1 | 1/2003 | Miyamoto et al. .......... 398/185 |

FOREIGN PATENT DOCUMENTS

| EP | 0 718 990 | 6/1996 |
| EP | 0 977 382 | 2/2000 |
| EP | 1 087 256 | 3/2001 |
| JP | 2000-106543 | 4/2000 |
| JP | 2001-147411 | 5/2001 |

OTHER PUBLICATIONS

M. Suyama, et al., "Improvement of WDM Transmission Performance by Non–Soliton RZ Coding", Optical Fiber Communication 1996 Technical Document PD 26 (Post Deadline Paper), Feb. 29, 1996.

Peter J. Winzer, et al., "Return–to–Zero Modulator Using a Single NRZ Drive Signal and an Optical Delay Interferometer", IEEE Photonics Technology Letters, vol. 13, No. 12, Dec. 2001, pp. 1298–1300.

* cited by examiner

*Primary Examiner*—David N. Spector
(74) *Attorney, Agent, or Firm*—Oblon, Spivak, McClelland, Maier & Neustadt, P.C.

(57) ABSTRACT

An optical modulator includes a phase modulator configured to drive light with an NRZI-coded drive signal for phase modulation and an intensity modulator to modulate the intensity of a phase-modulated NRZI-coded optical signal received from the phase modulator. The operating point of the intensity modulator is set such that the output of the intensity-modulated optical signal is eliminated when the NRZI-coded optical signal is not varied.

2 Claims, 8 Drawing Sheets

TIME (ps)

NORMALIZED MODULATION BANDWIDTH f/B

APPARATUS AND METHOD FOR OPTICAL MODULATION

CROSS REFERENCE TO RELATED APPLICATION

This application is based upon and claims the benefit of priority from the prior Japanese Patent Application No. P2001-294957, filed on Sep. 26, 2001; the entire contents of which are incorporated herein by reference.

BACKGROUND OF THE INVENTION

1. Field of the Invention

This invention relates to an apparatus for optical modulation and a method of optical modulation.

2. Description of the Related Art

Current high-speed/high-density wavelength division multiplexing optical transmission systems provide transmission equipment and intermediate repeaters with optical fiber amplifiers for the compensation of optical fiber loss and for the implementation of long-haul transmission. To achieve a larger span between intermediate repeaters while maintaining an appropriate signal to noise ratio at a receiving end requires an increase in optical power supplied to an optical fiber. The increase in optical power supplied to an optical fiber, however, results in an increase in the nonlinear optical effects of the optical fiber on the transmission characteristics. Especially in dense wavelength division multiplexing transmissions, the effect of XPM (Cross Phase Modulation) becomes a problem. XPM causes degradation in the waveforms of optical signals with different wavelengths propagating through an optical fiber, due to the interaction of the signals traveling through the optical fiber simultaneously for a short period of time although at different group velocities provided by dispersion.

Much research on XPM-caused waveform degradation has been conducted. For example, a report by M. Suyama et al. shows that RZ (Return-to-Zero) codes are less degraded by XPM than NRZ (Non-Return-to-Zero) codes (Optical Fiber Communication (OFC) 1996, Technical Document PD26-2). As demonstrated in this report, it has been found that RZ codes are suitable for long-haul transmission using optical fiber amplifiers in high-speed/high-density wavelength division multiplexing optical transmission systems.

In this context, an optical modulator including an NRZ/RZ converter for subjecting data signals and clock signals to NRZ/RZ conversion to provide RZ-coded output signals and a drive circuit for driving an optical intensity modulator with the RZ-coded output signals as drive signals are used (Japanese Patent Laid-Open Publication No. 2001-147411). In this optical modulator, the optical intensity modulator modulates light received from an optical source with an RZ-coded drive signal to provide an RZ-coded optical signal. Such a conventional optical modulator can provide an output of RZ-coded optical signals and is an effective solution to the XPM problem.

In the conventional optical modulator, however, in operating with RZ codes, the optical intensity modulator, NRZ/RZ converter and drive circuit are required to have a large frequency bandwidth. Such a wideband optical intensity modulator requires a modulation voltage higher than that of a narrowband optical intensity modulator for operation. Further, the drive circuit for driving the wideband optical intensity modulator needs to operate at high speeds with a larger output amplitude value than that of a drive circuit for driving a narrowband optical intensity modulator. In short, a drive circuit with high voltage output is required. However, high-speed drive circuits tend to use smaller-sized transistors and have lower breakdown voltage. This results in technical difficulties in configuring a high-speed high-voltage-output drive circuit.

Thus an apparatus and a method for optical modulation for outputting RZ-coded optical signals as optical transmission signals to suppress degradation due to XPM, eliminating the need for an optical modulator to have a large frequency bandwidth, is required.

BRIEF SUMMARY OF THE INVENTION

An object of the present invention is to provide an apparatus for optical modulation and a method of optical modulation which enable the output of an RZ-coded optical signal as an optical transmission signal to suppress degradation due to XPM and eliminate the need for an optical modulator to have a large frequency bandwidth.

An optical modulator according to an aspect of the present invention comprises a phase modulator configured to drive light with an NRZI-coded drive signal for phase modulation and an intensity modulator to modulate the intensity of a phase-modulated NRZI-coded optical signal received from the phase modulator. The operating point of the intensity modulator is set such that the output of the intensity-modulated optical signal is eliminated when the NRZI-coded optical signal is not varied.

An NRZI (Non-Return-to-Zero-Inverted) code is a code generated in a feedback shift register represented by generating polynomial X+1. An RZ (return-to-zero) code is a code of a type sending pulses shorter than the bit time length of the code and returning to zero during the remaining time without sending any pulse.

In this optical modulator, the phase modulator drives light with an NRZI-coded drive signal to generate an NRZI-coded optical signal which is supplied to the intensity modulator. The intensity modulator is prevented from outputting an intensity-modulated optical signal when the received phase-modulated NRZI-coded optical signal is not varied so that an optical signal output by the intensity modulator is an RZ-coded optical signal. The intensity modulator can thus output an RZ-coded optical signal as an optical signal sent out to an optical transmission path, preventing degradation due to XPM. The phase modulator is driven by an NRZI-coded drive signal, so that a frequency bandwidth required for the phase modulator is only approximately half the bit rate of a data signal by Nyquist theorem. The phase modulator thus does not need to have a large frequency bandwidth.

DETAILED DESCRIPTION OF THE INVENTION

With reference to the accompanying drawings, embodiments of the present invention will be described below.

[First Embodiment]

Figure 1:
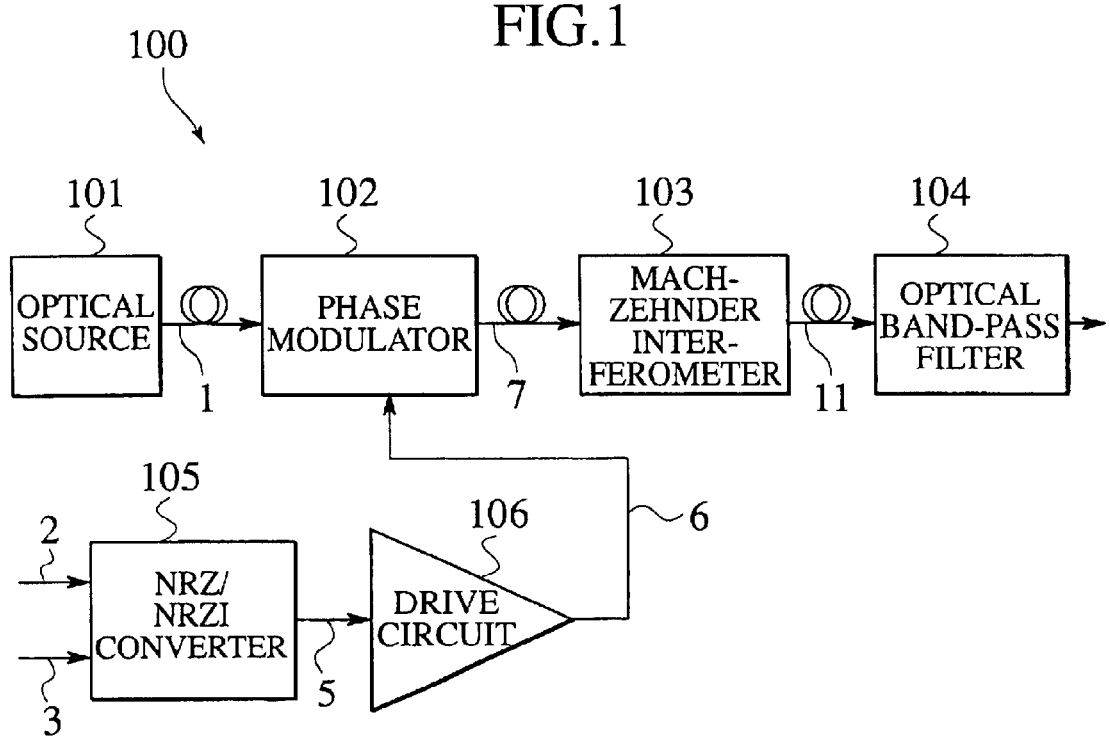
FIG. 1 is a block diagram illustrating the configuration of an optical modulator according to a first embodiment of the present invention.

FIG. 1 is a block diagram illustrating the configuration of an optical modulator 100 according to a first embodiment. The optical modulator 100 includes an optical source 101, a phase modulator 102, a Mach-Zehnder interferometer 103, an optical band-pass filter 104, an NRZ/NRZI converter 105, and a drive circuit 106.

The optical source 101 outputs light 1 to an input of the phase modulator 102. The optical source 101 may be, e.g., a semiconductor laser which oscillates in a single longitudinal mode. The phase modulator 102 drives the light 1 received from the optical source 101 with an NRZI-coded drive signal 6 for phase modulation. The phase modulator 102 is driven by the drive signal 6 fed from the drive circuit 106 to the phase modulator 102 for phase modulation. The phase modulator 102 supplies an NRZI-coded optical signal 7 obtained by the phase modulation to an input of the Mach-Zehnder interferometer 103.

Figure 2:
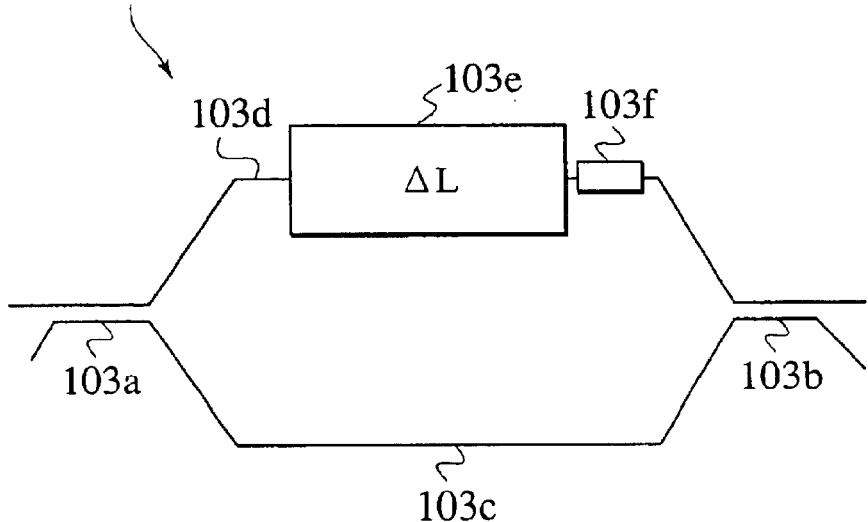
FIG. 2 is a diagram illustrating the configuration of a Mach-Zehnder interferometer according to the first embodiment of the present invention.

The Mach-Zehnder interferometer 103 is an intensity modulator for modulating the intensity of the phase-modulated NRZI-coded optical signal 7 received from the phase modulator 102. The Mach-Zehnder interferometer 103 splits the optical signal 7 received from the phase modulator 102 into a first optical signal and a second optical signal and combines the first and second optical signals for output. FIG. 2 is a diagram illustrating the configuration of the Mach-Zehnder interferometer 103. The Mach-Zehnder interferometer 103 includes a directional coupler 103a, a directional coupler 103b, an optical waveguide 103c, an optical waveguide 103d, and a phase adjuster 103f.

The directional coupler 103a splits the optical signal 7 fed to the Mach-Zehnder interferometer 103 into the two optical waveguides 103c and 103d. Specifically, the directional coupler 103a branches the optical signal 7 into a first optical signal to travel through the optical waveguide 103c and a second optical signal to travel through the optical waveguide 103d. Of the two optical waveguides 103c and 103d, the optical waveguide 103d is longer in length than the optical waveguide 103c by $\Delta L 103e$.

The directional coupler 103b combines the first and second optical signals respectively transmitted through the two optical waveguides 103c and 103d to output an optical signal 11. When the phase difference between the first and second optical signals supplied from the two optical waveguides 103c and 103d to the directional coupler 103b is $2k\pi+\pi/2$ (k is an integer), the directional coupler 103b transmits the optical signal 11 for output, and when the phase difference is $2k\pi-\pi/2$ (k is an integer), interrupts the optical signal 11 to eliminate the output of the directional coupler 103b.

With the intensity of the light 1 supplied from the optical source 101 to the Mach-Zehnder interferometer 103 as $A_0$ and with the intensity of the optical signal 11 the Mach-Zehnder interferometer 103 outputs as A, the intensity A of the optical signal 11 the Mach-Zehnder interferometer 103 outputs may be represented by the following Equation (1):

$$A = A_0 \frac{1 + \cos(\beta \Delta L + \Phi - \pi/2)}{2} \quad (1)$$

In Equation (1), $\beta=(2\times\pi\times f\times n_{eff}/C_0)$ where f denotes a frequency of the optical source 101, $C_0$ the speed of light, $n_{eff}$ an effective refractive index of the optical waveguides 103c and 103d.

In Equation (1), the value of $\beta\Delta L+\Phi$ is a phase difference between the first and second signals supplied from the two optical waveguides 103c and 103d to the directional coupler 103b. $\Delta L$ is, as described above, a length by which the optical waveguide 103d is set longer than the optical waveguide 103c. In theory, a phase difference between the first and second optical signals from the two optical waveguides 103c and 103d is represented as $\beta\Delta L$. In actuality, however, $\Delta L$ is provided only to the order of a few millimeters to a few tens of millimeters. It is impossible to preset $\Delta L$ to the order of a wavelength (microns) in order to provide a phase difference $\beta\Delta L$ of a desired value. In short, $\Delta L$ cannot be initially set to the order of a wavelength (microns).

For the above reason, the value of $\Phi$ is adjusted to set the phase difference between the first and second signals from the two optical waveguides 103c and 103d at a desired value. Thus the phase difference is practically represented as $\beta\Delta L+\Phi$ as described above. $\Phi$ is therefore a parameter representing a portion of the phase difference being left without being represented by $\Delta L$ which cannot be initially set on the order of a wavelength (microns) for setting the phase difference between the first and second optical signals from the two optical waveguides 103c and 103d.

Figure 3:
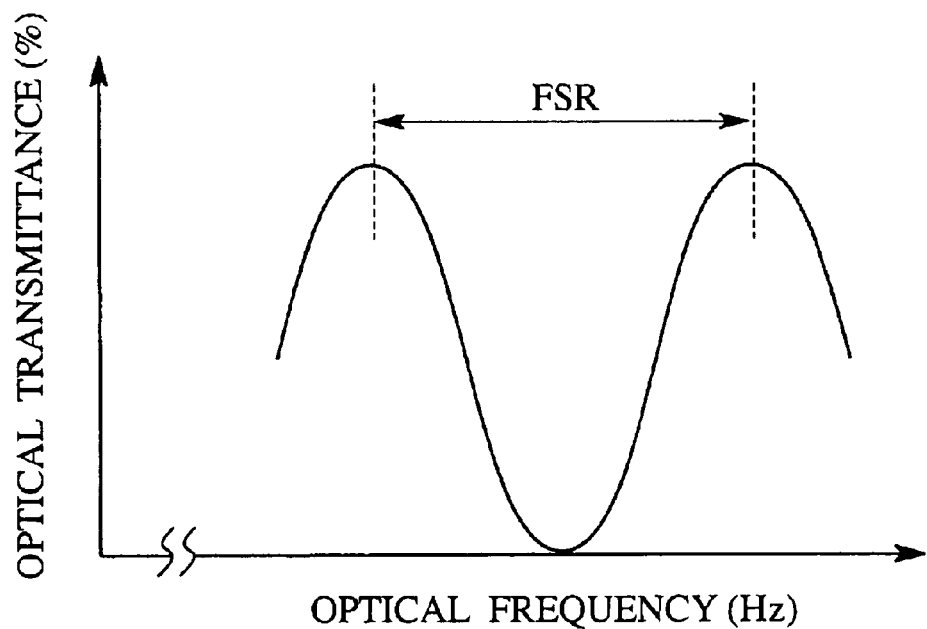
FIG. 3 is a graph illustrating the relationship between the optical transmittance and the optical frequency of the Mach-Zehnder interferometer according to the first embodiment of the present invention.

FIG. 3 is a graph illustrating the relationship between the optical transmittance and the optical frequency of the Mach-Zehnder interferometer 103 receiving the light 1 directly from the optical source 101 without the input of the drive signal 6 for driving the phase modulator 102 from the drive circuit 106 to the phase modulator 102. FIG. 3 illustrates the biased state of the Mach-Zehnder interferometer 103. The ordinate of the graph shown in FIG. 3 represents the optical transmittance ($A/A_0$) of the Mach-Zehnder interferometer 103 found from Equation (1). The abscissa represents the optical frequency of the light 1.

In FIG. 3, since the light 1 from the optical source 101 is directly supplied to the Mach-Zehnder interferometer 103, the intensity of light supplied to the Mach-Zehnder interferometer 103 is $A_0$ and the optical transmittance is represented as $A/A_0$. In FIG. 3, the interval between the values of the optical frequency at which the optical transmittance is maximized is a Free Spectral Range (hereinafter referred to as "FSR") of the Mach-Zehnder interferometer 103. The FSR may be calculated from the relationship in the following Equation (2) and represented by the following Equation (3):

$$\frac{2\pi n_{\mathit{eff}}(f + FSR)\Delta L}{C_0} - \frac{2\pi n_{\mathit{eff}} f \Delta L}{C_0} = 2\pi \qquad (2)$$

$$FSR = \frac{C_0}{n_{\mathit{eff}} \Delta L} \qquad (3)$$

The phase adjuster 103f adjusts the phase difference between the first and second optical signals supplied from the two optical waveguides 103c and 103d to the directional coupler 103b. The adjustment of the phase difference is performed such that the operating point of the Mach-Zehnder interferometer 103 is set to cause elimination of output when the phase of the NRZI-coded optical signal 7 is not varied. As described above, the directional coupler 103b transmits and outputs the optical signal 11 when the phase difference between the first and second optical signals from the two optical waveguides 103c and 103d is $2k\pi+\pi/2$ (k is an integer), and interrupts the optical signal 11 to cause elimination of the output of the directional coupler 103b when the phase difference is $2k\pi-\pi/2$ (k is an integer). The phase adjuster 103f thus adjusts the phase difference to $2k\pi-\pi/2$ (k is an integer) when the phase of the NRZI-coded optical signal 7 is not varied.

As described above, the phase difference is represented as $\beta\Delta L+\Phi$ and $\Delta L$ is predetermined. The phase adjuster 103f thus adjusts $\Phi$ as the adjustment of the phase difference. The phase adjuster 103f may be, e.g., a heater, and is provided at the midpoint of the optical waveguide 103d. The heater as the phase adjuster 103f adjusts the temperature of the optical waveguide 103d to expand or contract in length the optical waveguide 103d, adjusting $\Phi$ for the adjustment of the phase difference.

The NRZ/NRZI converter 105 is an electric circuit for converting an NRZ-coded data signal 2 supplied to the optical modulator 100 into an NRZI-coded output signal 5. An NRZ (Non-Return-to-Zero) code is a code of a type successively sending pulses during its time length without returning to volt zero. The NRZ/NRZI converter 105 uses a clock signal 3 supplied to the NRZ/NRZI converter 105 for code conversion.

Figure 4:
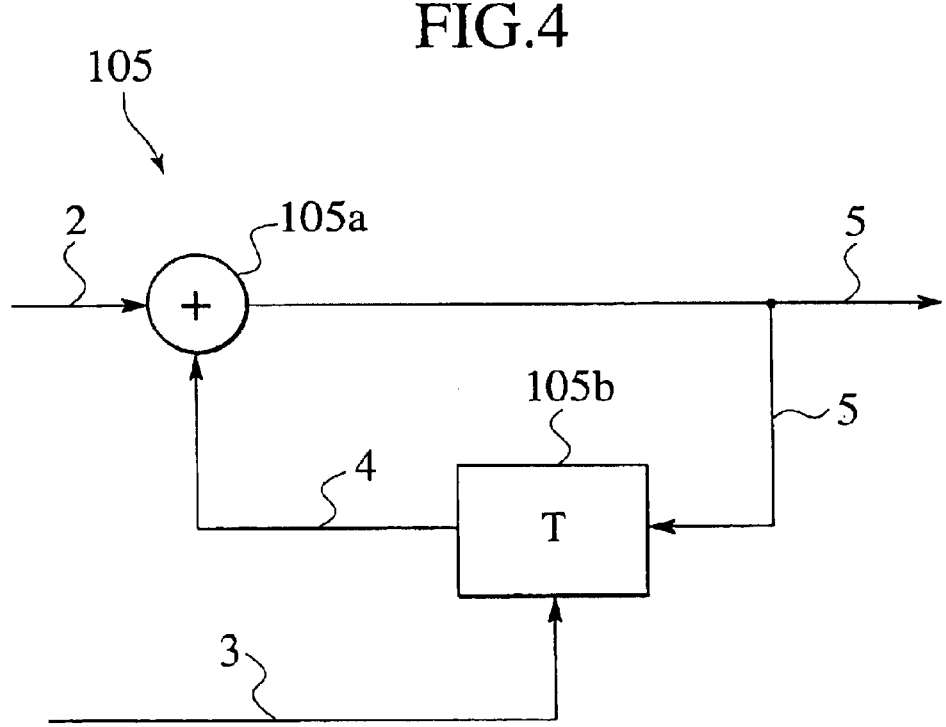
FIG. 4 is a diagram illustrating the configuration of an NRZ/NRZI converter according to the first embodiment of the present invention.

FIG. 4 is a diagram illustrating the configuration of the NRZ/NRZI converter 105. The NRZ/NRZI converter 105 includes an Exclusive-OR circuit (hereinafter referred to as an "EX-OR circuit") 105a and a 1-bit delay circuit 105b. The 1-bit delay circuit 105b delays the output signal 5 from the NRZ/NRZI converter 105 by 1 bit. The 1-bit delay circuit 105b may be implemented by, e.g., a flip-flop circuit using the clock signal 3 as a timing signal. In this embodiment, the initial value of the 1-bit delay circuit 105b is zero. The 1-bit delay circuit 105b supplies a 1-bit delayed signal 4 of the output signal 5 from the NRZ/NRZI converter 105 delayed by 1 bit, to an input of the EX-OR circuit 105a.

The EX-OR circuit 105a performs an exclusive OR operation on the data signal 2 supplied to the optical modulator 100 and on the 1-bit delayed signal 4 of the output signal 5 from the NRZ/NRZI converter 10S delayed by 1 bit. The result of the operation is the output signal 5 of the NRZ/NRZI converter 105. The EX-OR circuit 105a outputs "0" as the operation result when the data signal 2 and the 1-bit delayed signal 4 have the same value and "1" when the signals 2 and 4 have different values. Since the initial value of the 1-bit delay circuit 105b is "0" as described above, the EX-OR circuit 105a performs an exclusive OR operation on the initial value "0" and the data signal 2 first (when no output signal 5 is yet sent).

Figure 5:
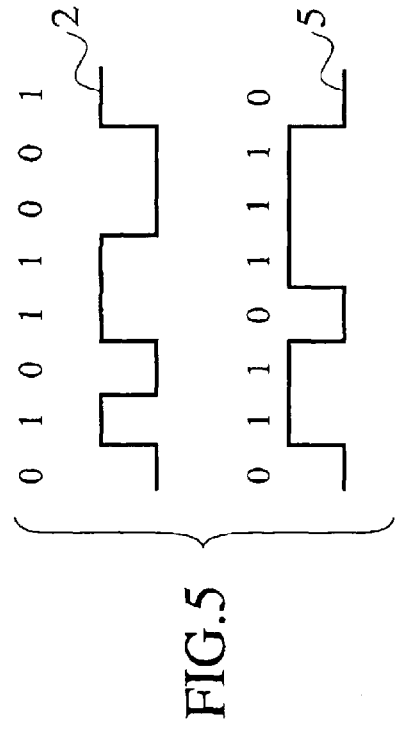
FIG. 5 is a diagram illustrating a data signal and an output signal according to the first embodiment of the present invention.

FIG. 5 is a diagram illustrating the data signal 2 supplied to the NRZ/NRZI converter 105 and the output signal 5 output by the NRZ/NRZI converter 105. In this embodiment, a bit string of "01011001" is used as the data signal 2. When the data signal 2 is supplied to the NRZ/NRZI converter 105, an NRZI-coded bit string of "01101110" is obtained as the output signal 5. With the bit string of the data signal 2 supplied to the NRZ/NRZI converter 105 as x(n), and with the bit string of the output signal 5 output by the NRZ/NRZI converter 105 as y(n), the operation performed by the NRZ/NRZI converter 105 may be represented by the following Equation (4):

$$y(n)=[y(n-1)+x(n)] \qquad (4)$$

The calculation of Equation (4) is performed with mod 2 operation. The mod 2 operation is an operation based on 0+0=0, 1+0=1, 0+1=1 and 1+1=0.

The drive signal 6 output by the drive circuit 106 drives the phase modulator 102. The drive circuit 106 is an electric circuit for amplifying an electric signal received from the NRZ/NRZI converter 105, that is, the NRZI-coded output signal 5. The drive circuit 106 drives the phase modulator 102 with the NRZI-coded drive signal 6 of the amplified output signal 5. As described above, the phase modulator 102 driven by the drive signal 6 modulates the light 1 received from the optical source 101 to output the optical signal 7. The optical signal 7 obtained by the modulation at the phase modulator 102 may be represented by the following Equation (5):

$$\sqrt{A_0} \cos\left(2\pi f t + \pi \frac{V}{V_\pi} + \phi_0\right) \qquad (5)$$

In Equation (5), V is a drive voltage of the phase modulator 102, $V_\pi$ is a half-wavelength voltage of the phase modulator 102, $\phi_0$ is an initial phase, and t is a time. The drive circuit 106 is not necessarily required to output maximum $V_\pi$.

The phase modulator 102 is thus driven by the NRZI-coded drive signal 6. The drive circuit 106 for driving the phase modulator 102 amplifies the NRZI-coded output signal 5. The NRZ/NRZI converter 105 outputs the NRZI-coded output signal 5. Thus a general frequency bandwidth required for the combination of the phase modulator 102, drive circuit 106 and NRZ/NRZI converter 105 is only B/2 (Hz) with the bit rate of the data signal 2 as B (b/s) by Nyquist theorem. To obtain the RZ-coded optical signal 11 at a bit rate of, e.g., 40 Gbit/sec, a frequency bandwidth required for the phase modulator 102 is only approximately 20 GHz.

The phase modulator 102 thus does not need to have a large frequency bandwidth and does not need a high modulation voltage. Since the phase modulator 102 does not need to have a large frequency bandwidth, the drive circuit 106 for driving the phase modulator 102 does not need to be both high-speed and have a high-voltage output. This eliminates the problem of difficulty in configuring a high-speed, high-voltage output drive circuit in terms of breakdown voltage.

Figure 6:
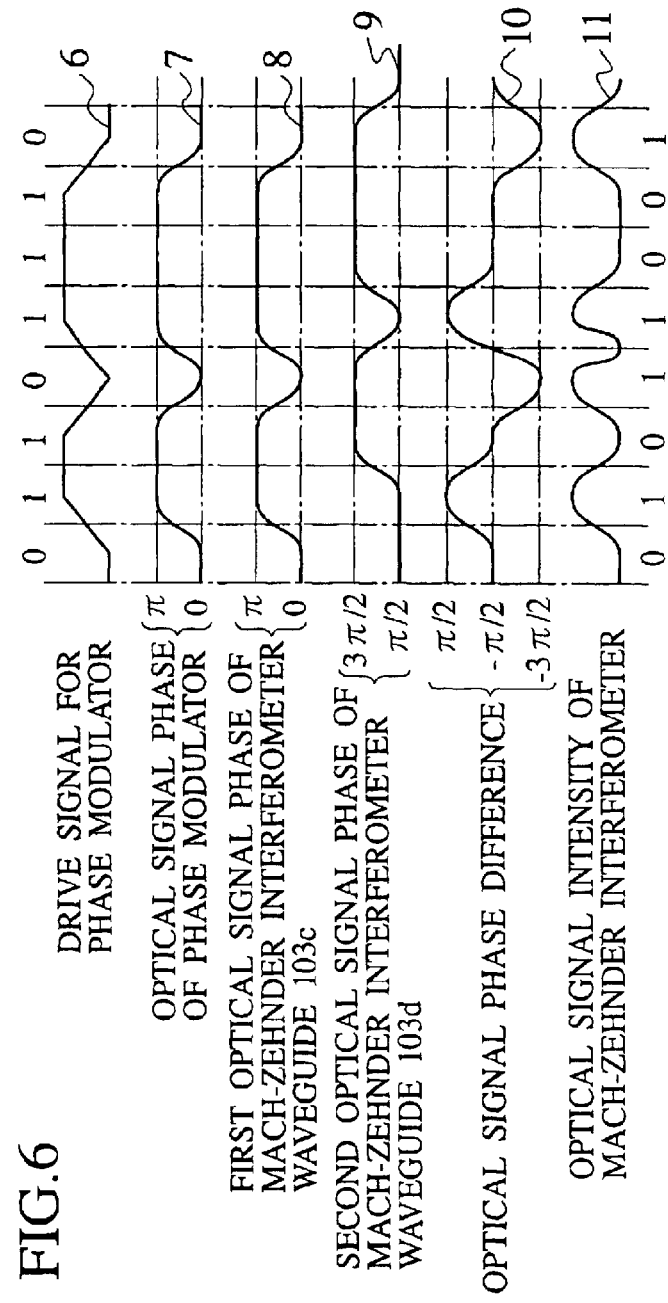
FIG. 6 is a diagram illustrating the relationship between a drive signal for a phase modulator, an optical signal of the phase modulator, a first optical signal, a second optical signal, the phase difference between the first and second signals, and an optical signal of the Mach-Zehnder interferometer according to the first embodiment of the present invention.

Now, with reference to FIG. 6, a method of modulating the light 1 supplied from the optical source 101 using the drive circuit 106, the phase modulator 102 and the Mach-Zehnder interferometer 103 will be described. FIG. 6 is a diagram illustrating the relationship between the drive signal 6 of the drive circuit 106 for driving the phase modulator 102, the phase of the phase-modulated optical signal 7 output by the phase modulator 102, the phases of the first and second optical signals 8 and 9 immediately before being supplied from the two optical waveguides 103c and 103d inside the Mach-Zehnder interferometer 103 to the directional coupler 103b, that is, the phases of the first and second optical signals 8 and 9 output by the optical waveguides 103c and 103d, the phase difference 10 between the first and second optical signals 8 and 9, and the intensity of the optical signal 11 output by the Mach-Zehnder interferometer 103.

With reference to FIG. 6 and for ease of description, the FSR of the Mach-Zehnder interferometer 103 is set at the inverse 1/T of 1 bit time slot T of the data signal 2 supplied to the NRZ/NRZI converter 105. The waveform of the drive signal 6 for driving the phase modulator 102 is a triangular waveform. The difference in time between the output of the optical signal 7 from the phase modulator 102 and the output of the optical signal 11 from the Mach-Zehnder interferometer 103 is 0. Specifically, as shown in FIG. 6, the optical signals 7 and 11 are assumed to be sent out in the same time slot. In actuality, there is a delay by a period of time during which the optical signal 7 is transmitted through the Mach-Zehnder interferometer 103 and the same time slot outputs as shown in FIG. 6 do not occur. As a bit string of the output signal 5 output by the NRZ/NRZI converter 105, "01101110" shown in FIG. 5 is used here.

The waveform of the drive signal 6 shown in FIG. 6 is a signal waveform for driving the phase modulator 102. The drive signal 6 is an NRZI-coded electric signal of the amplified output signal 5. As described above, the waveform of the drive signal 6 is assumed to be a triangular waveform with its voltage varying in ramps. That is, the voltage waveform linearly rises from the code "0" to "1" and linearly falls from the code "1" to "0." Here "0" indicates voltage 0 and "1" the half-wave length voltage $V_\pi$ of the phase modulator 102.

The waveform of the optical signal 7 shown in FIG. 6 is the waveform of the phase of the phase-modulated optical signal 7 output by the phase modulator 102. The waveform of the optical signal 7 is obtained by driving the light 1 supplied from the optical source 101 to the phase modulator 102 by the drive signal 6 shown in FIG. 6. This waveform represents the phase of the optical signal 7 represented by the above Equation (5). Here the initial phase $\phi_0$ in Equation (5) is assumed as 0 for convenience of description. The phase of the optical signal 7 changes, as shown in FIG. 6, from phase 0 to $\pi$ or from $\pi$ to 0 in a sine wave.

The waveforms of the first and second optical signals 8 and 9 shown in FIG. 6 represent the phases of the first and second optical signals 8 and 9 the two optical waveguides 103c and 103d of the Mach-Zehnder interferometer 103 output, respectively. The first and second optical signals 8 and 9 are obtained by branching the optical signal 7 shown in FIG. 6 received from the phase modulator 102. As shown in FIG. 6, the second optical signal 9 the optical waveguide 103d outputs is delayed by 1 time slot as compared with the first optical signal 8 output by the optical waveguide 103c. In other words, the second optical signal 9 output by the optical waveguide 103d is delayed by 1 bit as compared with the optical signal 8 output by the optical waveguide 103c.

The phase of the first optical signal 8 output by the optical waveguide 103c is the same as the phase of the optical signal 7 and varies between phase 0 and $\pi$. The phase of the second optical signal 9 output by the optical waveguide 103d is varied between $\pi/2$ and $3\pi/2$ as shown in FIG. 6. This is because the phase adjuster 103f adjusts the above described value $\Phi$ such that the phase of the second optical signal 9 the optical waveguide 103d outputs varies between $\pi/2$ and $3\pi/2$. The first optical signal 8 is set to have the same phase as that of the optical signal 7 so as to vary between phase 0 and $\pi$ and the value of $\Phi$ is adjusted to cause the phase of the second optical signal 9 to vary between $\pi/2$ and $3\pi/2$ for the adjustment of the phase difference between the first and second optical signals 8 and 9. The phase of the first bit of the second optical signal 9 the optical waveguide 103d of the Mach-Zehnder interferometer 103 outputs is assumed to be $\pi/2$.

The phase difference 10 of the optical signals shown in FIG. 6 is the phase difference between the first optical signal 8 the optical waveguide 103c outputs and the second optical signal 9 output by the optical waveguide 103d. More specifically, the phase difference 10 is a waveform representing the phase difference between the first and second optical signals 8 and 9 supplied from the two optical waveguides 103c and 103d to the directional coupler 103b of the Mach-Zehnder interferometer 103. As shown in FIG. 6, the value of the phase difference 10 ranges between $+\pi/2$ and $-3\pi/2$ with $-\pi/2$ as the center. As described above, the phase of the first optical signal 8 is set to vary between phase 0 and $\pi$, the phase of the second optical signal 9 is set to vary between $\pi/2$ and $3\pi/2$, and the second optical signal 9 is delayed by 1 bit as compared with the optical signal 8, so that the phase difference 10 between the first and second optical signals 8 and 9 is adjusted to $-\pi/2$ when the phase of the NRZI-coded optical signal 7 is not varied. Specifically, when the phase of the NRZI-coded optical signal 7 is not varied with the succession of "1," for example, the phase difference 10 is adjusted to $-\pi/2$.

The waveform of the optical signal 11 shown in FIG. 6 is a waveform representing the intensity of the optical signal 11 output by the Mach-Zehnder interferometer 103. The intensity of the optical signal 11 output by the Mach-Zehnder interferometer 103 is derived from Equation (1). As a result, when the phase difference 10 between the first and second optical signals 8 and 9 is $-\pi/2$, the optical signal 11 of the Mach-Zehnder interferometer 103 is interrupted and the output of the optical signal 11 is 0 (eliminated). When the phase difference 10 is $+\pi/2$ or $-3\pi/2$, the Mach-Zehnder interferometer 103 transmits the optical signal 11 and the output of the optical signal 11 is 1 (output). Thus the waveform of the optical signal 11 the Mach-Zehnder interferometer 103 outputs is as shown in FIG. 6.

Here the phase of the NRZI-coded optical signal 7 supplied from the phase modulator 102 to the Mach-Zehnder interferometer 103 is compared with the optical signal 11 output by the Mach-Zehnder interferometer 103. When the phase of the NRZI-coded optical signal 7 is not varied with the succession of "1," for example, the output of the optical signal 11 is "0" and eliminated. When the optical signal 7 varies from "0" to "1" or from "1" to "0," the output of the optical signal 11 is "1" and transmitted.

Thus adjusting the phase difference 10 between the first and second optical signals 8 and 9 to $-\pi/2$ when the phase of the NRZI-coded optical signal 7 is not varied allows the setting of the operating point of the Mach-Zehnder interferometer 103 such that the output of the Mach-Zehnder interferometer 103 is eliminated when the phase of the NRZI-coded optical signal 7 is not varied. Thus the operating point of the Mach-Zehnder interferometer 103 is easily set by the provision of the phase adjuster 103f to the optical waveguide 103d for the adjustment of the phase difference 10.

The reason why for first bit of the optical signal 11 that the Mach-Zehnder interferometer 103 outputs, that is, the head of the bit string of the optical signal 11 being "0" is that the phase of the second optical signal 9 that the optical waveguide 103d of the Mach-Zehnder interferometer 103 outputs is assumed to be $\pi/2$. The second optical signal 9 that the optical waveguide 103d of the Mach-Zehnder interferometer 103 outputs is 1-bit delayed from the first optical signal 8 output by the optical waveguide 103c. Thus the first bit of the optical signal 9 may be $3\pi/2$ instead of $\pi/2$. In this case, the first bit of the optical signal 11 that the Mach-Zehnder interferometer 103 outputs is "1."

Thus setting the operating point of the Mach-Zehnder interferometer 103 such that the output of the Mach-Zehnder interferometer 103 is eliminated when the NRZI-coded optical signal 7 is not varied causes an RZ-coded wave form of the optical signal 11 to be output by the Mach-Zehnder interferometer 103 with a bit string of "01011001" as shown in FIG. 6. This bit string is the same as the bit string of the NRZ-coded data signal 2 before being code-converted by the NRZ/NRZI converter 105 shown in FIG. 5. The optical modulator 100 thus obtains the RZ-coded optical signal 11 from the NRZ-coded data signal 2 supplied to the optical modulator 100 without changing the bit string of the data signal 2. The optical modulator 100 outputs the RZ-coded optical signal 11, thereby suppressing degradation due to XPM.

In the above description according to FIG. 6, the FSR of the Mach-Zehnder interferometer 103 is set at the inverse 1/T of 1 bit time slot T of the data signal 2 supplied to the NRZ/NRZI converter 105 and the second optical signal 9 is delayed by 1 bit as compared with the first optical signal 8 for convenience of description. The delay of the second optical signal 9 from the first optical signal 8 is not limited to 1 bit. The delay of the second optical signal 9 from the first optical signal 8 may be unless exceeding 1 bit. When the Mach-Zehnder interferometer 103 delays the second optical signal 9 by less than 1 bit as compared with the first optical signal 8, the interference noise of the output optical signal 11 becomes less than in the case of a 1-bit delay.

The Mach-Zehnder interferometer 103 then outputs the optical signal 11 to an input of the optical band-pass filter 104. The optical band-pass filter 104 spectrally narrows the optical signal 11 received from the Mach-Zehnder interferometer 103. The insertion of the optical band-pass filter 104 next to the Mach-Zehnder interferometer 103 allows the wavelength of the optical signal 11 to be made compact, substantially avoiding the effects of optical fiber chromatic dispersion. When the optical modulator 100 is used as an optical modulator for wavelength division multiplexing systems, the optical band-pass filter 104 prevents influence on adjacent wavelength channels. The optical band-pass filter 104 may be a dielectric multilayer filter, a fiber Bragg grating filter, a circulated grating filter or a Fabry-Perot interferometer filter.

When the optical modulator 100 is used as an optical modulator for wavelength division multiplexing systems, a multiplexer (hereinafter referred to as a "MUX") for wavelength-multiplexing may be used as the optical band-pass filter 104. This is because a wavelength-multiplexing MUX has band-pass filter characteristics and these characteristics can be utilized. With this, the optical signal 11 that the Mach-Zehnder interferometer 103 outputs is directly supplied to an input of the wavelength-multiplexing MUX, eliminating the need for providing a band-pass filter to the optical modulator 100.

Now simulations performed by the inventors will be described.

[Simulation 1]

Figure 7:
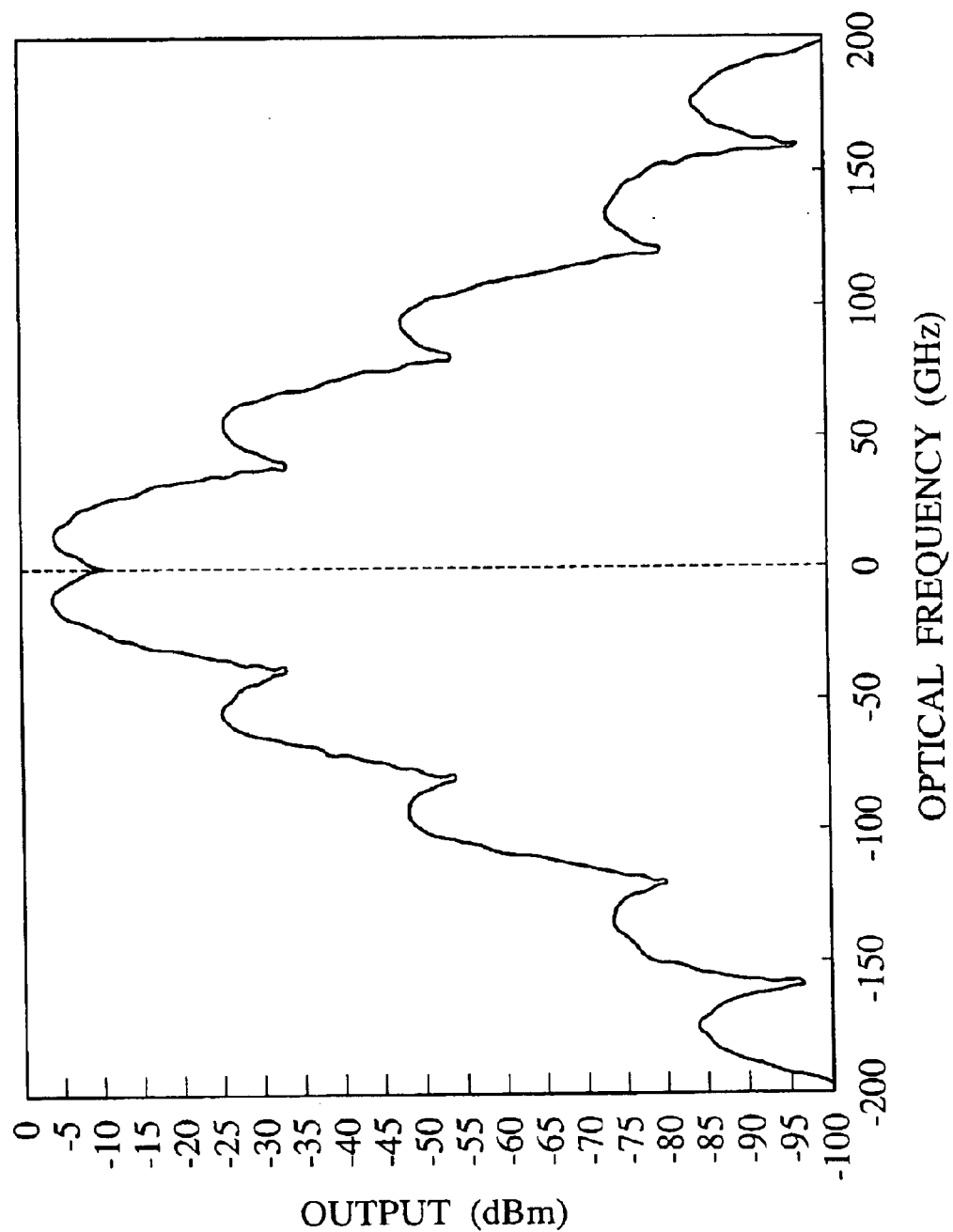
FIG. 7 is a graph illustrating the spectrum of an optical signal of the Mach-Zehnder interferometer according to the first embodiment of the present invention.

In a simulation performed, an NRZ-coded 64-bit string of "1010010010101010000100101101110010001010111010 111110011011010010" is supplied as the data signal 2 to the optical modulator 100. For the parameters of the simulation, the bit rate of the NRZ-coded data signal 2 is set at 40 Gbit/sec, the degree of modulation of the phase modulator 102 is set at 50% (driven to $V_\pi/2$), and the FSR of the Mach-Zehnder interferometer 103 is set at 40 GHz. FIG. 7 is a graph illustrating the spectrum of the optical signal 11 the Mach-Zehnder interferometer 103 outputs as the result of the simulation. The ordinate of the graph shown in FIG. 7 represents the output (dBm) of the optical signal 11 that and the abscissa indicates the optical frequency (GHz). The center value 0 of the abscissa represents 193.4 THz.

As shown in FIG. 7, the spectrum of the optical signal 11 supplied from the Mach-Zehnder interferometer 103 to the band-pass filter 104 shows the existence of an upper sideband and a lower sideband. The optical signal 11 has an optical carrier wave (optical carrier) suppressed. The optical modulator 100 thus provides the RZ-coded optical signal 11 with a suppressed carrier. A modulation scheme for obtaining such a carrier-suppressed RZ-coded optical signal is called a CS-RZ (Carrier-Suppressed Return-to-Zero) scheme. The CS-RZ modulation scheme provides the effect of reducing receiver sensitivity degradation due to nonlinear optical effects, even with a high optical power input to the optical fibers.

Conventional optical modulators adopting the CS-RZ modulation scheme include one with two Mach-Zehnder intensity modulators connected in series. This conventional apparatus first obtains an NRZ-coded optical signal by an upstream Mach-Zehnder intensity modulator. The conventional apparatus then drives a downstream Mach-Zehnder intensity modulator with a clock signal of a frequency half the bit rate of a data signal. At that time, the conventional apparatus sets the operating point of the Mach-Zehnder intensity modulator to output no optical signal when the drive voltage is 0. The conventional apparatus drives the downstream Mach-Zehnder intensity modulator when the optical transmittance characteristics of the Mach-Zehnder intensity modulator are a quadratic function to obtain a carrier-suppressed RZ-coded optical signal. Conventional apparatus requires strict agreement between the phases of two Mach-Zehnder intensity modulators and needs two Mach-Zehnder intensity modulators, resulting in a complicated configuration. However the optical modulator 100 implements the CS-RZ modulation scheme with a simple configuration of the combination of the phase modulator 102 and the Mach-Zehnder interferometer 103. The optical modulator 100 easily obtains the effect of reducing receiver sensitivity degradation due to nonlinear optical effects even with a high optical power input to optical fibers.

[Simulation 2]

Figure 8:
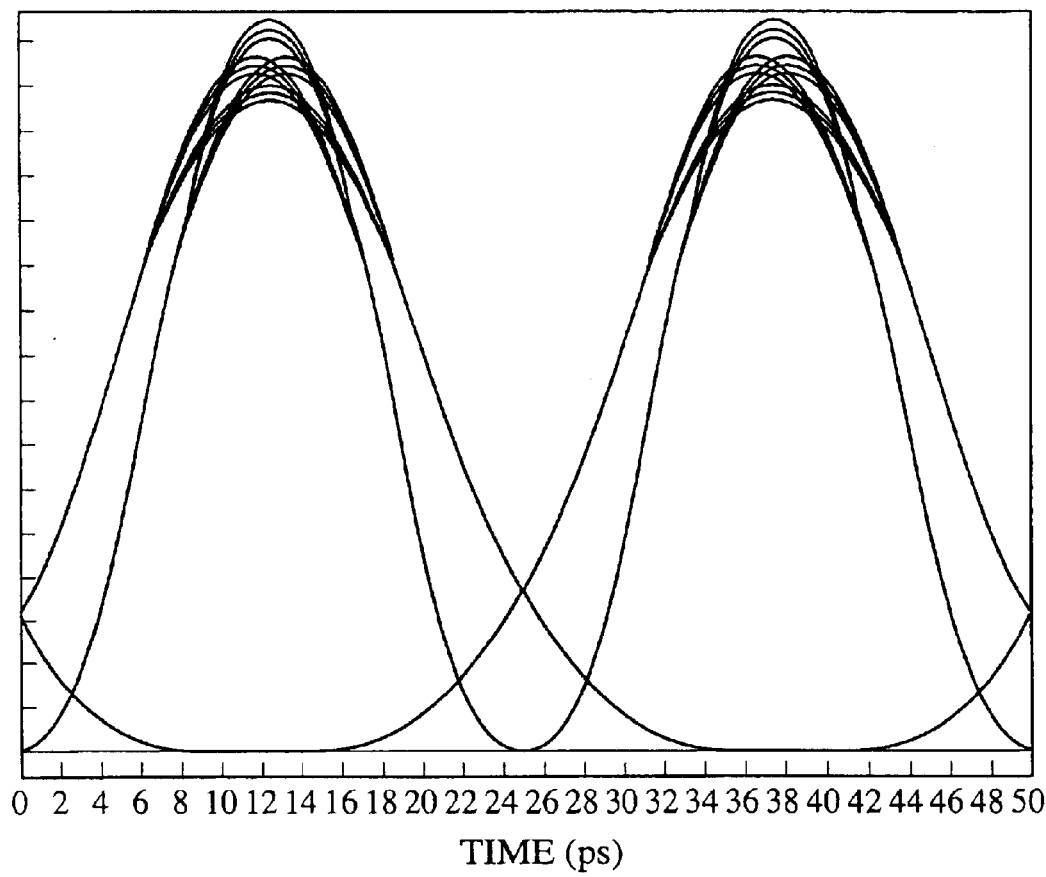
FIG. 8 is a graph illustrating an eye diagram according to the first embodiment of the present invention.

In another simulation, a super Gaussian biquadratic filter is used as the band-pass filter 104 and an optical signal output by the optical band-pass filter 104 is converted into an electric signal to display an eye diagram. The full width at half value of the super Gaussian biquadratic filter is set at 80 GHz. The super Gaussian biquadratic filter causes the center frequency of the optical band-pass filter 104 to substantially agree with the oscillation wavelength of the optical source 101 and substantially agree with the frequency of the light 1 that the optical source 101 outputs, and transmits both modulated spectral sidebands. FIG. 8 is a graph illustrating an eye diagram resulting from the simulation. The ordinate shown in FIG. 8 is an arbitrary axis and the abscissa is a time (ps).

As shown in FIG. 8, the optical modulator 100 provides a normal eye diagram and a substantially RZ-coded electrical signal even after the spectral narrowing by the optical band-pass filter 104. The center frequency of the optical band-pas filter 104 is caused to substantially agree with the frequency of the light 1 that the optical source 101 outputs and both modulated spectral sidebands (upper and lower sides) are transmitted, so that the optical modulator 100 achieves the modulation of a Double SideBand scheme (hereinafter referred to as a "DSB scheme"). The modulation in the DSB scheme has an advantage of facilitated demodulation.

[Simulation 3]

Now comparison is made in a required frequency bandwidth between a conventional optical modulation method using a conventional optical modulator which uses an NRZ-RZ converter to directly obtain an RZ-coded optical signal with a drive circuit and an optical intensity modulator operated by an RZ code and the optical modulation method using the optical modulator 100 according to the present embodiment which obtains the RZ-coded optical signal 11 with the NRZ-NRZI converter 105, drive circuit 106, phase modulator 102 and Mach-Zehnder interferometer 103. For this purpose, the relationship between a general modulation bandwidth (general frequency bandwidth) of the optical intensity modulator and the drive circuit of the conventional optical modulator and the eye opening at a receiver, and the relationship between a general modulation bandwidth (general frequency bandwidth) of the phase modulator 102 and the drive circuit 106 of the present embodiment and the eye opening at a receiver are simulated.

Figure 9:
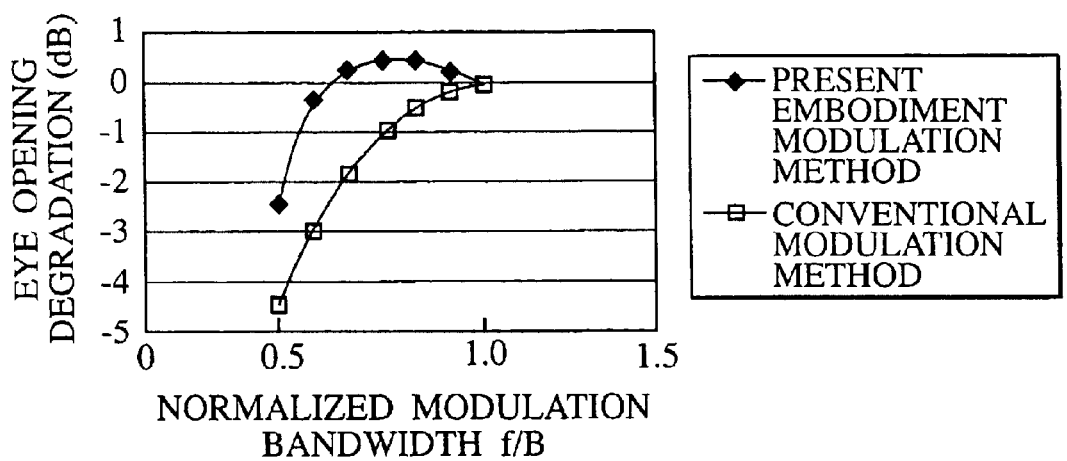
FIG. 9 is a graph illustrating the relationship between a modulation bandwidth and the degradation of eye opening according to the first embodiment of the present invention.

FIG. 9 is a graph illustrating, as a result of the simulation, the relationship between the modulation bandwidth and the degradation in eye opening. In the graph shown in FIG. 9, the abscissa represents a normalized modulation bandwidth f/B with a general modulation bandwidth (3 dB degraded frequency) f divided by bit rate B of the data signal 2. With the eye opening at the receiver when f/B=1 as the reference (0 dB), the ordinate represents the degradation of the eye opening from the reference. The words "eye opening" mean the ratio of the difference in value between the maximum and minimum values of an output waveform and the maximum value of the eye opening of the eye diagram.

As shown in FIG. 9, in the optical modulation method using the optical modulator 100 according to this embodiment, the general modulation bandwidth (3 dB degraded frequency) of the phase modulator 102 and the drive circuit 106 needs a frequency only approximately half the bit rate of the data signal 2. In the conventional optical modulation method using the conventional optical modulator, the general modulation bandwidth (3 dB degraded frequency) needs a frequency approximately equal to the bit rate of the data signal 2.

[Second Embodiment]

Figure 10:
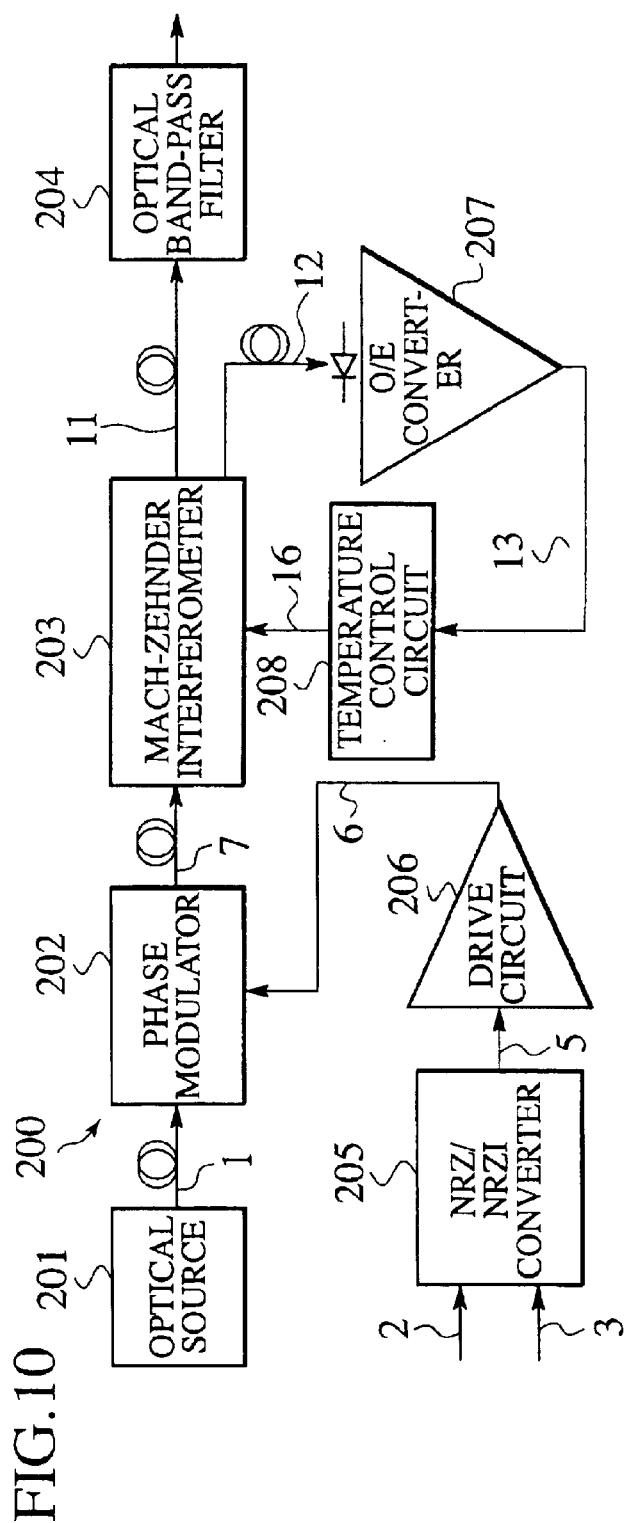
FIG. 10 is a block diagram illustrating the configuration of an optical modulator according to a second embodiment of the present invention.

FIG. 10 is a block diagram illustrating the configuration of an optical modulator 200 according to a second embodiment. The optical modulator 200 includes an optical source 201, a phase modulator 202, a Mach-Zehnder interferometer 203, an optical band-pass filter 204, an NRZ-NRZI converter 205, a drive circuit 206, an O/E converter 207, and a temperature control circuit 208. In FIG. 10, the optical source 201, phase modulator 202, optical band-pass filter 204, NRZ-NRZI converter 205 and drive circuit 206 are substantially identical to the optical source 101, phase modulator 102, optical band-pass filter 104, NRZ-NRZI converter 105 and drive circuit 106 of the optical modulator 100 shown in FIG. 1 and will not be described herein.

Figure 11:
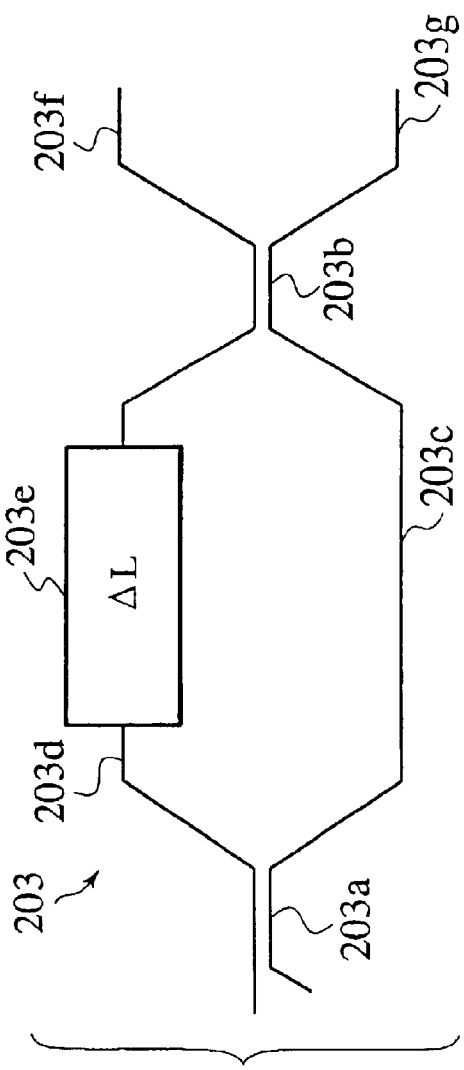
FIG. 11 is a diagram illustrating the configuration of a Mach-Zehnder interferometer according to the second embodiment of the present invention.

FIG. 11 is a diagram illustrating the configuration of the Mach-Zehnder interferometer 203. The Mach-Zehnder interferometer 203 includes directional couplers 203a and 203b, optical waveguides 203c and 203d, and first and second output ports 203f and 203g. The directional coupler 203a and the optical waveguide 203c are substantially identical to the directional coupler 103a and the optical waveguide 103c of the Mach-Zehnder interferometer 103 shown in FIG. 2, and will not be described herein.

The optical waveguide 203d is set longer in length than the optical waveguide 203c by ΔL203e. The directional coupler 203b is connected to the first and second output ports 203f and 203g and supplies optical signals thereto. The directional coupler 203b combines first and second optical signals 8 and 9 transmitted through the two optical waveguides 203c and 203d and supplies a combined optical signal 11 to the first output port 203f. The directional coupler 203b supplies the second output port 203g with an optical signal 12 which is complementary to the optical signal 11 supplied to the first output port 203f.

The first output port 203f outputs the optical signal 11 of the combined first and second optical signals 8 and 9 respectively transmitted through the optical waveguides 203c and 203d. The optical signal 11 is identical to the optical signal 11 output by the Mach-Zehnder interferometer 103 shown in FIG. 2 outputs and has a bit string of "01011001." The second output port 203g outputs the optical signal 12 complementary to the optical signal 11 that the first output port 203f outputs. The optical signal 12 is in a complementary relationship with the optical signal 11. The temperature control circuit 208 uses the optical signal 12 to control the temperature of the Mach-Zehnder interferometer 203.

The sum of power of the optical signals 11 and 12 output by the first and second output ports, respectively, is always constant. The first output port 203f supplies the optical signal 11 to the optical band-pass filter 204. The second output port 203g supplies the optical signal 12 to the O/E converter 207. Since the Mach-Zehnder interferometer 203 includes the first and second output ports 203f and 203g, the first output port 203f outputs the optical signal 11 and the second output port 203g outputs the optical signal 12 to be used for the temperature control of the Mach-Zehnder interferometer 203. The O/E converter 207 converts the optical signal 12 received from the second output port 203g into an electric signal 13. The O/E converter 207 supplies the resulting electric signal 13 to the temperature control circuit 208.

The temperature control circuit 208 generates a temperature control signal 16 using the electric signal 13. The temperature control circuit 208 supplies the temperature control signal 16 to the Mach-Zehnder interferometer 203 to control the temperature of the entire Mach-Zehnder interferometer 203. Controlling the temperature of the Mach-Zehnder interferometer 203 using the temperature control circuit 208 enables the adjustment of the above-described Φ. As described above, the phase difference 10 between the first and second optical signals 8 and 9 from the optical waveguides 203c and 203d is represented as βΔL+Φ, and ΔL is predetermined. The temperature control circuit 208 is thus a temperature controller for controlling the temperature of the Mach-Zehnder interferometer 203, adjusting Φ, and thereby adjusting the phase difference 10.

The temperature control circuit 208 adjusts the phase difference 10, setting the operating point of the Mach-Zehnder interferometer 203 such that the output of the optical signal 11 the first output port 203f outputs is eliminated when the phase of the NRZI-coded optical signal 7 is not varied. As described above, the directional coupler 203b transmits the optical signal 11 to output the optical signal 11 to the first output port 203f when the phase difference between the first and second optical signals 8 and 9 from the optical waveguides 203c and 203d is 2kπ+π/2 (k is an integer), and interrupts the optical signal 11 so that the output of the first output port 203f is eliminated when the phase difference is 2kπ−π/2 (k is an integer).

The temperature control circuit 208 controls the temperature of the Mach-Zehnder interferometer 203, adjusting Φ to provide the phase difference of 2kπ−π/2 (k is an integer) when the phase of the NRZI-coded optical signal 7 is not varied. The provision of the temperature control circuit 208 to adjust the phase difference 10 facilitates the setting of the operating point of the Mach-Zehnder interferometer 203 such that the output of the optical signal 11 from the first output port 203f is eliminated when the phase of the NRZI-coded optical signal 7 is not varied.

When the temperature control circuit 208 controls the temperature of the Mach-Zehnder interferometer 203, adjusting Φ, and thereby adjusting the phase difference 10 to cause elimination when the phase of the NRZI-code optical signal 7 is not varied, the intensity of the optical signal 12 the second output port 203g outputs is maximum. Controlling the temperature of the Mach-Zehnder interferometer 203 using the temperature control circuit 208 to maximize the intensity of the optical signal 12 output by the second output port 203g allows the setting of the operating point of the Mach-Zehnder interferometer 203 to provide the phase difference of −π/2 and elimination when the phase of the NRZI-coded optical signal 7 is not varied.

Thus preventing the first output port 203f of the Mach-Zehnder interferometer 203 from outputting of the optical signal 11 when the phase-modulated NRZI-coded optical signal 7 is not varied causes the optical signal 11 that the first output port 203f outputs to be an RZ-coded optical signal 11. The Mach-Zehnder interferometer 203 thus outputs the RZ-coded optical signal 11 as an optical transmission signal, suppressing degradation due to XPM. The simple configuration of the combination of the phase modulator 202 and the Mach-Zehnder interferometer 203 implements the CS-RZ modulation scheme, providing a carrier-suppressed RZ-coded optical signal. Being driven by the NRZI-coded drive signal, the phase modulator 202 does not require a large frequency bandwidth and does not need a high modulation voltage. The drive circuit 206 thus does not need to be both high-speed and have a high-voltage output.

Figure 12:
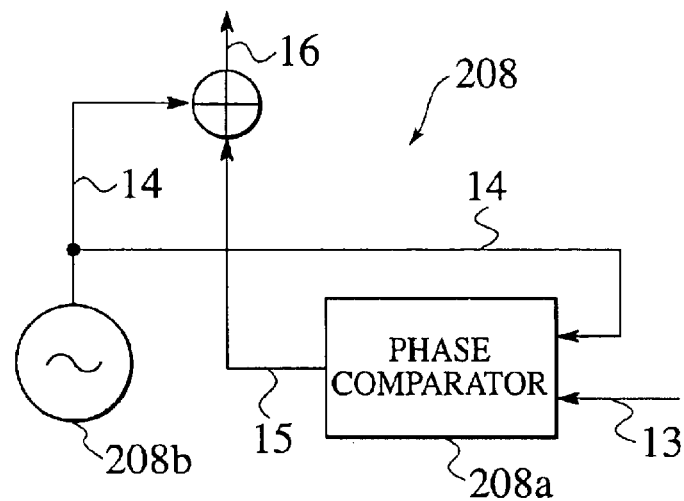
FIG. 12 is a diagram illustrating the configuration of a temperature control circuit according to the second embodiment of the present invention.

FIG. 12 is a diagram illustrating the configuration of the temperature control circuit 208. As shown in FIG. 12, the temperature control circuit 208 includes a phase comparator 208a and a dither signal generator 208b. The dither signal generator 208b generates a low-frequency dither signal 14.

The dither signal generator 208b supplies the generated low-frequency dither signal 14 to the phase comparator 208a. The dither signal generator 208b superimposes the generated low-frequency dither signal 14 on a phase comparison output signal 15 output by the phase comparator 208a. The phase comparator 208a receives the electric signal 13 after conversion from the O/E converter 207 and receives the low-frequency dither signal 14 from the dither signal generator 208b.

The phase comparator 208a converts the electric signal 13 and the low-frequency dither signal 14 and outputs the result of the conversion as the phase comparison output signal 15. The dither signal generator 208b superimposes the low-frequency dither signal 14 on the phase comparison output signal 15 output by the phase comparator 208a to generate a temperature control signal 16 for the Mach-Zehnder interferometer 203. The temperature control circuit 208 thus uses the electric signal 13 generated by the conversion of the optical signal 12 at the O/E converter 207 to generate the temperature control signal 16. The temperature control circuit 208 supplies the temperature control signal 16 to the Mach-Zehnder interferometer 203 for the temperature control of the Mach-Zehnder interferometer 203.

The optical waveguide 203d of the Mach-Zehnder interferometer 203 shown in FIG. 11 does not have any phase adjuster as shown in FIG. 2. The temperature control circuit 208 controls the temperature of the entire Mach-Zehnder interferometer 203. The Mach-Zehnder interferometer 203 may be provided inside with a phase adjuster, and the temperature control circuit 208 may control the phase adjuster. For example, in the same manner as in FIG. 2, the Mach-Zehnder interferometer 203 may be provided with a heater as a phase adjuster in the optical waveguide 203d, and the temperature control circuit 208 may control the temperature of the heater.

The optical modulator 200 is provided with the Mach-Zehnder interferometer 203 including the first and second output ports 203f and 203g and the temperature control circuit 208 using the optical signal 12 output by the second port 203g for temperature control. The optical modulator 200 may use a Mach-Zehnder interferometer 203 not including the second output port 203g, and the temperature control circuit 208 may perform temperature control in a manner not using the optical signal 12. The optical modulator 200 may use any temperature controller other than the temperature control circuit 208 to control the temperature of the Mach-Zehnder interferometer 203.

[Third Embodiment]

Figure 13:
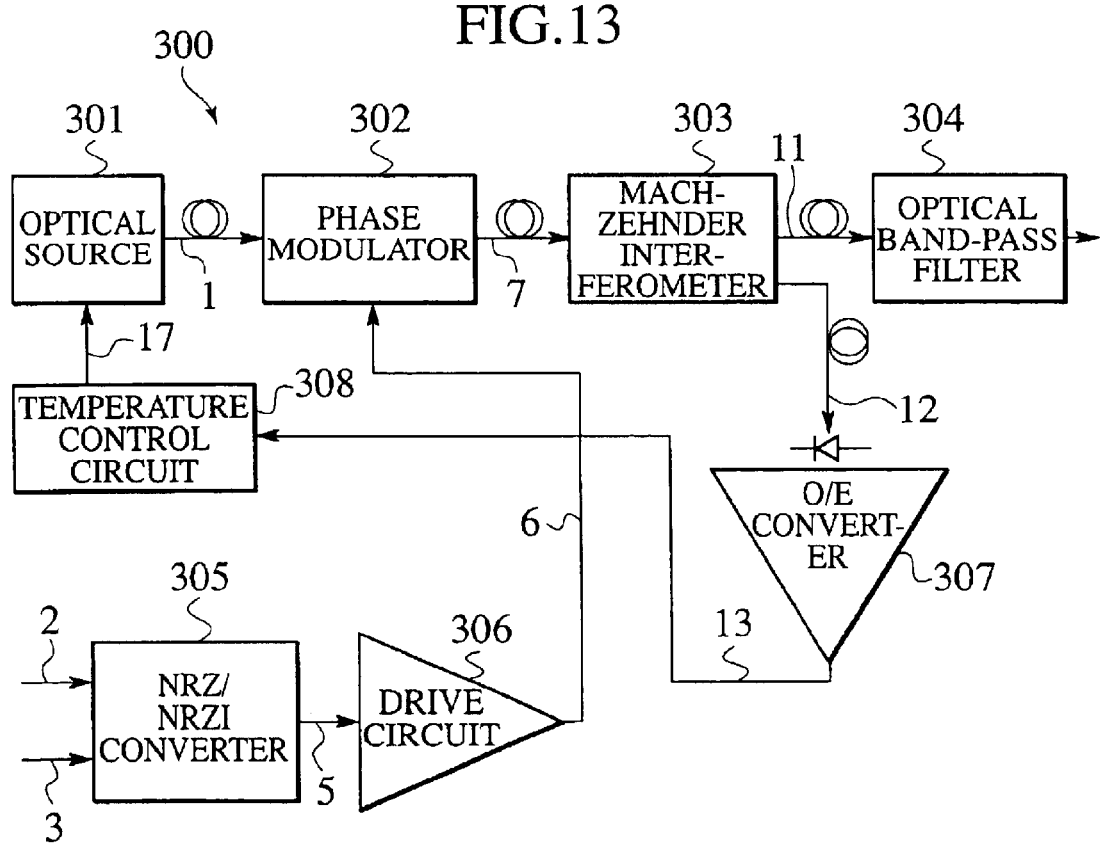
FIG. 13 is a block diagram illustrating the configuration of an optical modulator according to a third embodiment of the present invention.

FIG. 13 is a block diagram illustrating the configuration of an optical modulator 300 according to a third embodiment. The optical modulator 300 includes an optical source 301, a phase modulator 302, a Mach-Zehnder interferometer 303, an optical band-pass filter 304, an NRZ-NRZI converter 305, a drive circuit 306, an O/E converter 307 and a temperature control circuit 308. In FIG. 13, the optical source 301, phase modulator 302, Mach-Zehnder interferometer 303, optical band-pass filter 304, NRZ-NRZI converter 305, drive circuit 306 and O/E converter 307 which are substantially identical to the optical source 201, phase modulator 202, Mach-Zehnder interferometer 203, optical band-pass filter 204, NRZ-NRZI converter 205, drive circuit 206 and O/E converter 207 in the optical modulator 200 shown in FIG. 10, and will not be described herein.

In the optical modulator 300 shown in FIG. 13, a light signal 12 a second output port outputs is used by the temperature control circuit 308 to control the temperature of the optical source 301. The Mach-Zehnder interferometer 303 includes first and second output ports as if the Mach-Zehnder interferometer 203 shown in FIG. 11, so that the first port outputs an optical signal 11 and the second port outputs the optical signal 12 that is used for controlling the temperature of the optical source 301.

The temperature control circuit 308 receives an electric signal 13 of the converted optical signal 12 from the O/E converter 307. The temperature control circuit 308 uses the electric signal 13 to generate a temperature control signal 17 for controlling the temperature of the optical source 301. The temperature control circuit 308 supplies the temperature control signal 17 to the optical source 301 to control the temperature of the optical source 301. Controlling the temperature of the optical source 301 using the temperature control circuit 308 allows the control of the frequency of light 1 output by the optical source 301. Controlling the frequency of the light 1 results in the adjustment of the above-described Φ. The temperature control circuit 308 is thus a frequency controller for controlling the temperature of the optical source 301, controlling the frequency of the light 1, and thereby adjusting a phase difference 10.

The temperature control circuit 308 adjusts the phase difference 10 such that the operating point of the Mach-Zehnder interferometer 303 is set to eliminate output when the phase of the NRZI-coded optical signal 7 is not varied. The temperature control circuit 308 controls the temperature of the optical source 301, controlling the frequency of the optical source 301, and thereby adjusting Φ such that the phase difference is $-\pi/2$ when the phase of the NRZI-coded optical signal 7 is not varied. The optical modulator 300 is thus provided with the temperature control circuit 308 to adjust the phase difference 10, so that the operating point of the Mach-Zehnder interferometer 303 is easily set such that the output of the optical signal 11 the first output port outputs is eliminated when the phase of the NRZI-coded optical signal 7 is not varied.

When the temperature control circuit 308 controls the temperature of the optical source 301, controlling the frequency of the optical source 301, and thereby adjusting the phase difference 10 so that the first output port of the Mach-Zehnder interferometer 303 is eliminated when the phase of the NRZI-coded optical signal 7 is not varied, the optical signal 12 output by the second output port is maximum. Controlling the temperature of the optical source 301 by the temperature control circuit 308, thereby controlling the frequency of the optical source 301 such that the intensity of the optical signal 12 the second port outputs is maximized allows the adjustment of the phase difference 10 to $-\pi/2$ when the phase of the NRZI-coded optical signal 7 is not varied.

Preventing the first output port of the Mach-Zehnder interferometer 303 from outputting the optical signal 11 when the phase-modulated NRZI-coded optical signal 7 is not varied causes the optical signal 11 output by the first output port to be an RZ-coded optical signal 11. The Mach-Zehnder interferometer 303 thus outputs the RZ-coded optical signal 11 as an optical transmission signal, suppressing the degradation due to XPM. The simple configuration of the combination of the phase modulator 302 and the Mach-Zehnder interferometer 303 implements the CS-RZ modulation scheme, providing the carrier-suppressed RZ-coded optical signal 11. Being driven by the NRZI-coded drive signal, the phase modulator 302 does not require a large frequency bandwidth and does not need a high modulation voltage. The drive circuit 306 thus does not need to be both high-speed and have a high-voltage output.

The configuration of the temperature control circuit 308 is substantially identical to the temperature control circuit 208 shown in FIG. 12. The phase comparator 208a performs conversion on the electric signal 13 and a low-frequency dither signal 14 and outputs the result of the conversion as a phase comparison output signal 15. A dither signal generator 208b superimposes the low-frequency dither signal 14 on the phase comparison output signal 15 output by the phase comparator 208a to generate a temperature control signal 17 to the optical source 301. The optical modulator 300 may use any other temperature controller instead of the temperature control circuit 308 to control the temperature of the optical source 301. The optical modulator 300 may also use any other method apart from controlling the temperature of the optical source 301 to control the frequency of the optical source 301.

[Fourth Embodiment]

Figure 14:
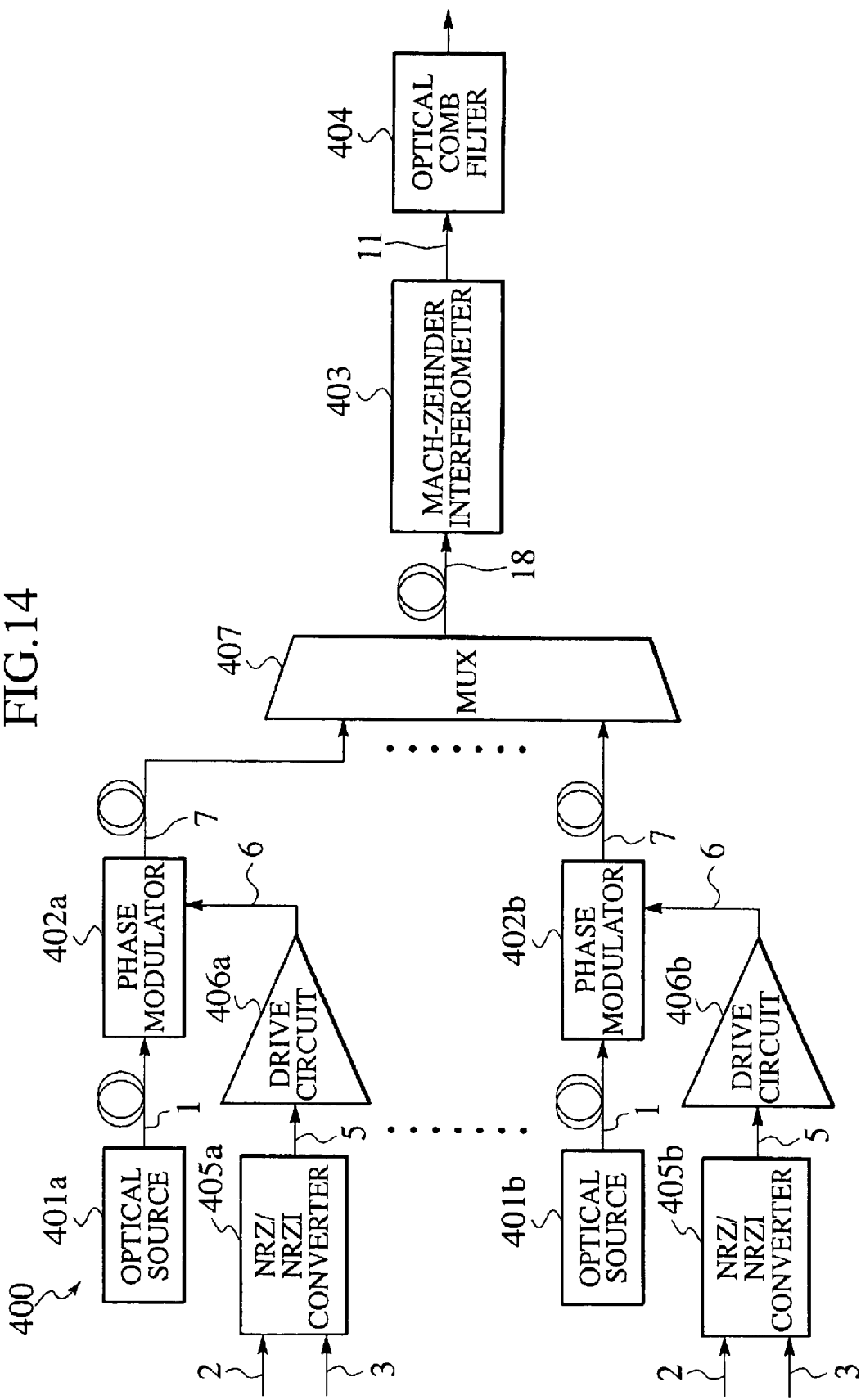
FIG. 14 is a block diagram illustrating the configuration of an optical modulator according to a fourth embodiment of the present invention.

FIG. 14 is a block diagram illustrating the configuration of an optical modulator 400 according to a fourth embodiment. The optical modulator 400 includes a plurality of optical sources 401a and 401b, a plurality of phase modulators 402a and 402b, a Mach-Zehnder interferometer 403, an optical comb filter 404, a plurality of NRZ-NRZI converters 405a and 405b, a plurality of drive circuits 406a and 406b, and an MUX 407. Although FIG. 14 shows the two optical sources 401a and 401b, the two phase modulators 402a and 402b, the two NRZ/NRZI converters 405a and 405b, and the two drive circuits 406a and 406b, any number of each of these components may be used, if greater than one.

In FIG. 14, the optical sources 401a and 401b, NRZ/NRZI converters 405a and 405b and drive circuits 406a and 406b are substantially identical to the optical source 101, NRZ/NRZI converter 105 and drive circuit 106 in the optical modulator 100 shown in FIG. 1, and will not be described herein.

The phase modulators 402a and 402b each modulate the phase of light 1 with an NRZI-coded drive signal 6 like the phase modulator 102 of the optical modulator 100 shown in FIG. 1. The phase modulators 402a and 402b supply NRZI-coded optical signals 7 obtained by the phase modulation to the MUX 407.

The MUX 407 performs wavelength-multiplexing on the NRZI-coded optical signals 7 received from the phase modulators 402a and 402b. The MUX 407 supplies an optical signal 18 obtained by wavelength-multiplexing the optical signals 7 to the Mach-Zehnder interferometer 403.

The Mach-Zehnder interferometer 403 modulates the intensities of the optical signals 7 contained in the optical signal 18 obtained by wavelength-multiplexing of the optical signals 7, received from the MUX 407. As shown in FIG. 3, the optical transmittance of the Mach-Zehnder interferometer 403 periodically varies with respect to the optical frequency. The Mach-Zehnder interferometer 403 thus periodically performs intensity modulation in the valley of the waveform shown in FIG. 3. The single Mach-Zehnder interferometer 403 modulates the intensities of the optical signals 7 contained in the optical signal 18 obtained by wavelength-multiplexing of the optical signals 7 at respective intervals. The frequency interval of a wavelength-multiplexed signal is set at an integral multiple of the FSR of the Mach-Zehnder interferometer 403. The Mach-Zehnder interferometer 403 modulates the intensities of the optical signals 7 to output a plurality of RZ-coded optical signals 11 like the Mach-Zehnder interferometer 103 of the optical modulator 100 shown in FIG. 1. The Mach-Zehnder interferometer 403 supplies the optical signals 11 obtained by the intensity modulation to the optical comb filter 404 which periodically passes signals with a plurality of wavelengths.

In order for the Mach-Zehnder interferometer 403 to modulate the intensities of the optical signals 7 contained in the wavelength-multiplexed optical signal 18 at respective intervals, the delay of a second optical signal 9 from a first optical signal 8 in the Mach-Zehnder interferometer 403 should be equal to or less than 1 bit. The Mach-Zehnder interferometer 403 delays the second optical signal 9 by 1 bit or less as compared with the first optical signal 8. More specifically, the Mach-Zehnder interferometer 403 sets ΔL to satisfy Equation (3) and sets the FSR at the inverse 1/T of a time slot T of a 1-bit time slot of the data signal 2 or the inverse 1/T' of a time slot T' less than the 1-bit time slot. In this manner, the Mach-Zehnder interferometer 403 delays the second optical signal 9 by 1 bit or less as compared with the first optical signal 8.

Since the optical modulator 400 includes the optical sources 401a and 401b, phase modulators 402a and 402b, optical comb filter 404, NRZ/NRZI converters 405a and 405b, drive circuits 406a and 406b and MUX 407, the intensities of the optical signals 7 wavelength-multiplexed by the MUX 407 can be modulated by the single Mach-Zehnder interferometer 403. This leads to a reduction in the size and cost of the optical modulator 400.

[Fifth Embodiment]

The optical spectrum of the optical signal 11 obtained by the optical modulation method using the optical modulator 100, 200, 300 or 400 shown in FIGS. 1, 10, 13 or 14 has the optical carrier frequency suppressed as shown in FIG. 7. This is used to shift the center frequency of the optical band-pass filter 104, 204 or 304 or the optical comb filter 404 from the frequency of the light 1 output by the optical source 101, 201, 301, 401a or 401b. This allows the optical band-pass filter 104, 204 or 304 or the optical comb filter 404 to pass one sideband of the modulated spectral sidebands more than the other sideband for extraction.

For example, the optical band-pass filter 104, 204 or 304 or the optical comb filter 404 passes the upper sideband more than the lower sideband for extraction. This allows the optical modulator 100, 200, 300 or 400 to perform facilitated modulation in a Single SideBand scheme (hereinafter referred to as "SSB scheme"). The optical modulator 100, 200, 300 or 400 using the SSB modulation scheme as a modulation scheme for dense wavelength division multiplexing uses a bandwidth of half the bandwidth used in the DSB modulation scheme, achieving approximately twice the transmission capacity. The optical modulator 100, 200, 300 or 400 receives less effect of optical fiber chromatic dispersion because of the narrowed spectrum width of the optical signal.

The above description of the optical modulators according to the embodiments of the present invention is not intended to limit the present invention thereto. For example, the Mach-Zehnder interferometers 103, 203, 303 and 403 may include Y-branches instead of directional couplers. In the case of Y-branches, the phase difference 10 between the first and second optical signals 8 and 9 transmitted through the two optical waveguides should be adjusted to π so as to cause elimination of the output of the Mach-Zehnder interferometers 103, 203, 303 and 403. The phase difference 10 to cause elimination of the output of the Mach-Zehnder interferometers 103, 203, 303 and 403 depends on the configurations of the Mach-Zehnder interferometers 103, 203, 303 and 403.

The optical modulator may use a Mach-Zehnder interferometer of a bulk optical system as the Mach-Zehnder interferometer 103, 203, 303 or 403. The optical modulator may use any modulator other than a Mach-Zehnder interferometer as an intensity modulator. Although the degree of phase modulation of the phase modulators 102, 202, 302 and 402 is set at π for convenience of description, the value may be any in a range not exceeding π to obtain the RZ-coded optical signal 11. Although the optical modulators 100, 200, 300 and 400 include the NRZ-NRZI converters 105, 205, 305, 405a and 405b, the NRZ-NRZI converters may be omitted if the data signal 2 supplied to the optical modulators has an NRZI code.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for optical modulation, comprising:

a phase modulator configured to drive light with an NRZI-coded drive signal for phase modulation; and an intensity modulator configured to modulate the intensity of a phase-modulated NRZI-coded optical signal received from said phase modulator, and having an operating point adjusted such that the output of said intensity-modulated optical signal is eliminated when a phase of said NRZI-coded optical signal is substantially fixed.

2. A method of optical modulation, comprising:

driving, at a phase modulator, light with an NRZI-coded drive signal for phase modulation;

modulating, at an intensity modulator, the intensity of a phase-modulated NRZI-coded optical signal received from said phase modulator; and adjusting an operating point of said intensity modulator such that an output of said intensity-modulated optical signal is eliminated when a phase of said NRZI-coded optical signal is substantially fixed.

* * * * *